Figure 1:
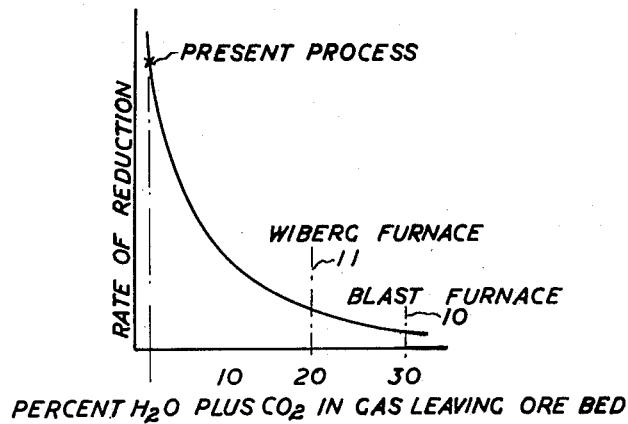

April 30, 1957   P. E. CAVANAGH   2,790,710
METHOD OF REDUCING METAL OXIDES
Filed June 18, 1954

Inventor
PATRICK E. CAVANAGH
by Fetherstonhaugh & Co
Attorneys

United States Patent Office 2,790,710
Patented Apr. 30, 1957

2,790,710

METHOD OF REDUCING METAL OXIDES

Patrick E. Cavanagh, Oakville, Ontario, Canada, assignor to Ontario Research Foundation, Toronto, Ontario, Canada, a corporation of Canada Application June 18, 1954, Serial No. 437,714

18 Claims. (Cl. 75—34)

This invention relates to a method of and apparatus for rapidly reducing a bed of non-compacted oxygen bearing metal containing material, hereinafter referred to as "reducible material," to metallic form.

I prefer to reduce such material to metallic form by supporting it in non-compacted condition in a permeable support or mould in a reducing zone operating at less than melting temperatures. The material may be cohered after reduction and during the same heating cycle, if preferred, to form a unitary body of the shape of the support and referred to in my prior teachings as a "sub-density" body. In some cases, however, it may be desired to avoid coherence of the metallic particles of material and thus form a metal powder. Regardless, the reducing gas generator or source is disposed exterior of the material being reduced and the gas is passed into or out of the material through the permeable support. This preferred type of reduction process shall be referred to hereinafter as "permeable support reduction."

According to the invention, a slab of subdensity metal or a bed of a mass of metal particles may be formed directly from a loose mass of supported reducible material by permeable support reduction methods wherein the loose mass merely rests upon a permeable support of slab-like form. Accordingly, the material being reduced may be conveyed while supported by the permeable support so that the individual particles will not tend to stick to one another (as occurs, for example, in the practice of rotary kiln reduction techniques), until cohered by a further heating or welding process specifically provided following reduction.

Thus, an object of the invention is to provide a continuous method of permeable support reduction for forming metal powders from reducible materials.

By reason of the known relation between the surface area, diameter and weight of various sized particles, it will be realized that a smaller particle possesses a greater surface area in proportion to the mass thereof. The theoretical maximum rate of reduction of a material will be obtained when the smallest practical particle thereof is contacted with an infinite volume of pure reducing gas. In practice, a reducing gas forms reaction products at the surface upon which it is acting so that according to the invention, reducing gas is moved rapidly over the surface of a particle being reduced.

It is another object of the invention to keep the concentration of reaction products in a mass of material being reduced at a minimum throughout the mass by sizing the mass to relatively fine particle size and passing an excess of a reducing gas therethrough at a sufficient speed to realize a minimum of reaction products at the exit surface of the mass.

A further object of the invention is to provide uniform rapid reduction of a mass of reducible material.

A still further object of the invention is to so proportion a bed of reducible material in conjunction with the direction and rate of reducing gas flow therethrough, that the particles of said bed are substantially simultaneously and uniformly reduced to metallic form.

With these and other objects in view, the invention generally comprises passing a reducing gas through a bed of reducible material to provide a comparatively small amount of reaction products at the gas exit surfaces of said bed.

Other objects of the invention will be appreciated by a study of the following specification taken in conjunction with the accompanying drawings.

Figure 2:
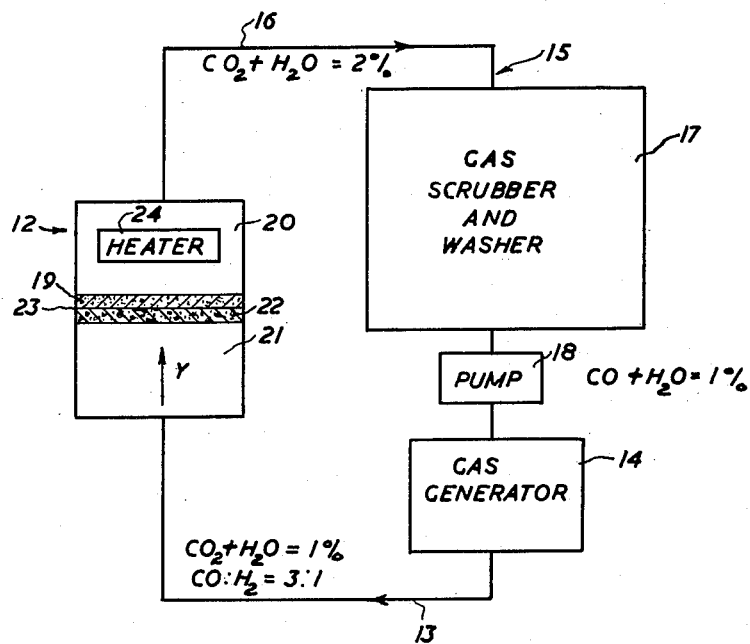

In the drawings:

Figure 1 is a trend curve generally indicating reduction of iron ore at 2000° Fahrenheit, showing in what manner the rate of reduction is affected by the percentage of reaction products in the gas leaving the gas exit surface of the ore during reduction; and Figure 2 is a diagrammatic outline of apparatus operative according to the method of the invention.

Reduction of iron oxide ore to metallic iron may be carried out by heating the iron oxide in a reducing atmosphere. If the temperature of reduction is above about 800° Fahrenheit, and time is no object, it is only necessary to have a reducing gas of either hydrogen or carbon monoxide or both, rich enough to carry reduction to completion. As reduction proceeds, reaction products, carbon dioxide or water vapour, or both, are produced. As the proportion of these reaction products builds up in the reducing gas, a condition of equilibrium is approached. In order to obtain complete reduction to metallic iron, it is necessary to have less than the equilibrium percentage of the reaction products for the particular reduction temperature present in the gas phase. Let us assume that the reduction temperature is 1800° Fahrenheit in a reducing zone containing both carbon monoxide and hydrogen. Then the equilibrium percentage of carbon dioxide in carbon monoxide will be about 30% and the equilibrium percentage of water vapour in hydrogen will be about 38%. In order to obtain complete reduction, the percentages of the reaction products $CO_2$ and $H_2O$ must be less than the quoted figures.

The speed of the reaction is governed by the distance from the equilibrium composition that the gas has at any moment. That is, hydrogen gas containing one-half percent water vapour will react much faster at 1800° Fahrenheit than the same gas containing 25% water vapour. In order to speed up the reduction process, it is proposed to contact the iron oxide with reducing gas having the least possible percentage of reaction products.

Referring to Figure 1, the line 10 generally indicates the rate at which reduction proceeds in a blast furnace in the zone where the temperature is about 1800° Fahrenheit. A non-melting class of furnace for producing sponge iron such as the Wiberg furnace is indicated as to rate of reduction by the line 11. In prior apparatus design, the main factor considered in conjunction with the character of the ore, ore depth, exit surface dusting velocity and other factors, is maximum gas utilization per unit of gas volume upon which the efficiency of the particular process depends.

It should be observed, however, that as the percentage of reaction products, generally indicated by the percentage of $H_2O$ and $CO_2$ decreases at the exit surface of the ore bed, the rate of reduction for the bed increases markedly to a point where minimum gas utilization per unit of gas volume delivers negligible quantities of reaction products. However, volume rate or quantity of gas flow per unit time is determined by the desired gas utilization per unit of gas volume so that large volume rates of gas flow are required for speedy reduction rates. Moreover, as before mentioned, the reduction rate is materially affected by the size, surface character, porosity, and chemical nature of the material particles while in general, the smallest particle will reduce fastest. Also, gas utilization per unit of gas volume in the first instance with a fresh gas is rapid and then proceeds more slowly as the percentage of reaction products rises. However, the invention contemplates a relatively shallow ore bed in order to approximate uniform reduction throughout the bed in the direction of gas flow while assuming substantially uniform heating. Obviously, total gas required to reduce a given amount of reducible material will be the same, regardless of the particular gas utilization per unit of gas volume.

The various matters thus raised are of assistance to a comprehensive examination of Figure 2, illustrating one general form of apparatus adapted to the method of the reduction.

A reducing zone of chamber 12 isolated from atmospheric gases has reducing gas injected therein in the preferred direction of arrow Y from a line 13 leading from any conventional form of reducing gas generator 14. The reducing gas circuit 15 for purposes of the invention, is of the closed or regenerative type wherein gases from the chamber 12 proceed by line 16 to a gas scrubber and washer device 17 adapted to remove reaction products $CO_2$ and $H_2O$ therefrom. The device 17 may operate in the conventional manner but is of much larger capacity in a plant installation than similar apparatus ordinarily used at the present time for gas cleaning. A pump 18 preferably disposed between the device 17 and generator 14 ensures sufficient gas volume delivery through the reducing chamber 12.

In the present illustration, the reducing gas may be assumed to accumulate 1% in reaction products in passing through the reducing chamber. A relatively shallow bed of reducible material 19 is supported in the reducing chamber in order to minimize gas utilization per unit of gas volume during passage therethrough. If the same utilization per unit of gas volume were to be accomplished with a deeper bed, greater gas velocities would be required. Accordingly, the optimum conditions for a given gas utilization per unit of gas volume are determined by a rate of gas flow through the bed insufficient to cause disruption thereof.

Gas flow disrupts a bed of finely divided material by channeling passages therethrough and by causing very fine particles to blow free of the gas exit surfaces. The invention contemplates restricting the gas flow to a multitude of passages effectively conforming to the passages provided by the voids in the bed 19. This is accomplished by separating the chamber 12 into two compartments, 20 and 21, by means of a permeable support 22 formed of a porous body of a permeability preferably not materially greater than the permeability of the bed 19 to gas flow therethrough. In this respect, it is preferred that the surface openings of the permeable support bed 22 be of a diameter insufficient to permit undue stoppage thereof by material of the bed 19. The permeable support preferably comprises a porous body of bonded carbon grains having an average generally uniform pore diameter between 0.010 and 0.001 inch. For example, when reducing a bed of iron ore of minus 60 mesh screen size of say one-half inch depth, the bonded carbon grain permeable support may be of an average pore diameter of .005 inch of 48 percent effective porosity which measures an average air permeability at 2 inches water pressure of 17 cubic feet per square foot of surface area per minute per inch of thickness. Under conditions of very low gas utilization per unit of gas volume, the gas throughput may be of the order of 4 to 40 cubic feet per minute per square foot of permeable support through a one-quarter inch thickness of permeable support. The gas flow will be restricted by the passages provided by the voids of the permeable support to a multitude of fine streams emanating in random directions from the boundary surface 23 thereof and uniformly distributed over the lower boundary surfaces 23 of the bed in such manner that channeling is obviated at gas throughput rates where disruption would otherwise occur. Moreover, from the foregoing, it should be apparent that the differences in the resistance to gas travel through the ore bed are minimized by raising the total resistance to gas flow through the chamber 12 by introducing a permeable support which may preferably offer the same or greater resistance.

As will be apparent from Figure 2, a mixture of reducing gases in predetermined proportions may be preferred, particularly in the reduction of iron ores. As shown, the gas mixture may contain carbon monoxide and hydrogen in a ratio of three to one. The reducing gas coming from the reducing zone 12 may contain two percent of reaction products where, by way of example, half of the reaction products may be removed in the device 17, leaving one percent of reaction products in the reducing gas mixture entering the reducing zone. As indicated, the reducing zone may be heated by any suitable heating device 24 such as electrical resistance heating elements, gas flame, or other means.

The preferred arrangement of heating source and gas flow in relation to the permeable support and ore bed is illustrated in Figure 2. Notice that the ore bed is heated from above the support, while the reducing gas is introduced from below. Two most desirable results follow in that relatively cool reducing gases may keep the permeable support at relatively low temperatures while the heating progresses from the upper surface of the ore bed downwardly. Accordingly, where the reducing gas flow through the ore bed is in a direction toward the heat source, it will be evident that particles at the exit surface of the bed will be reduced faster under higher reducing temperature conditions while there exists a quantity of reaction products in the gas near the exit surface causing a lesser rate of reducing activity. The two conditions tend to offset one another. In the region of the boundary layer 23, the reducing gas has an optimum rate of activity whereas the temperature may be lower than at the exit surface so that in this case also, the two conditions tend to offset one another. Therefore, when the reducing gas moves through the ore bed toward the heat source according to the invention, a uniformity of reduction is accomplished to a degree that in the case of shallow bed reduction by this means, all particles of the bed are reduced substantially simultaneously.

If the reducing gas moves in the opposite direction to that shown in Figure 2, an operative result may be obtained but the same uniformity of reduction obviously will not be accomplished except perhaps in the case of extremely shallow ore beds. A further disadvantage may arise in that reaction products may react with the material of the permeable support.

In the case where the heat source is below the permeable support and reducing gases flow in the direction shown in Figure 2, non-uniformity of reduction may arise. Also, the lower particles of the ore bed may tend to weld together or adhere to the permeable support while the permeable support itself will unnecessarily be subjected to undue heating.

In the final case where the heat source is disposed below the permeable support and the gas flows toward it from above through the ore bed, uniformity of reduction may be achieved along with even higher rates of gas flow. In general, however, it is more desirable to avoid undue heating of the permeable support and accordingly, the preferred arrangement is shown in Figure 2.

The invention contemplates that the permeable support may be placed at the gas entry or exit surface of the bed of reducible material. In processing where it is not necessary to move the ore bed or permeable support during reduction, for example, when forming a simple square slab in a reducing zone, the ore bed may be supported on both the gas entry and exit surfaces thereof by permeable supports permitting optimum gas flow therethrough and effectively eliminating channeling of the ore bed.

Under conditions where the reduced bed of ore is cohered to form a subdensity body, it is contemplated that the ore bed may be pre-sintered before or during reduction by heating to cohere such bed to a degree permitting higher rates of gas flow therethrough while practicing reduction in the manner shown in Figure 2. Such pre-sintering treatment may benefit reduction by breaking up the crystal formation of the ore so that an even greater uniformity and speed of reduction may be achieved.

Maximum gas utilization per unit volume in passing through the bed of reducible material is the aim of processes of the prior art. The present reducing process aims at a practical minimum of gas utilization per unit of gas volume on passing through the bed of reducing material. Such concept involves a proportioning of the bed in conjunction with rate of gas flow therethrough to minimize the time during which a unit volume of reducing gas contacts the material of the bed on passing therethrough. If the reducing gas used contains reaction products, then the increase in reaction products upon passing the gas through the bed will still be kept to a practical minimum. The time period necessary to pass a reducing gas through a mass of reducible material will usually be of the order of less than one second. For example, one quarter second time period has been utilized under conditions of Figure 2 on a bed one-half inch thick, formed of minus 60 mesh screen size magnetite at 2000° F. A shallow bed of reducible material according to the invention is intended to be contrasted with the deep beds of a blast furnace or Wiberg furnace, and in most cases will be less than four inches deep, depending principally upon the size of the material to be reduced.

While the invention has been discussed with reference to very high gas flow rates and very rapid reduction, it will be realized that it is not necessary or even desirable to aim at minimum gas utilization per unit gas volume in all cases. Therefore, the method and apparatus of the invention are in general intended to provide a faster reduction of an ore bed in a more uniform manner than heretofore, to deliver either a granulated product or cohered shaped product. The product, while formed from a shallow bed of reducible material, may nevertheless be of a selected width which, in conjunction with the rate of reduction, offers a production capacity for apparatus and in some cases, of greatly reduced capital and operating cost per unit of production capacity.

What I claim as my invention is:

1. The method of reducing particles of oxygen bearing metal containing material to metallic form with a reducing gas, comprising: forming with said particles a gas permeable bed having voids and of a shallow depth defined by gas entry and exit surfaces thereof; isolating said bed from the atmosphere; heating said isolated bed to a reducing temperature less than that sufficient to substantially close the voids thereof due to melting of said particles; regeneratively passing a reducing gas through said bed from the entry to the exit surfaces thereof; and removing reducing reaction products from said gas at a rate corresponding to the rate of formation of said products during passage of said gas through said bed.

2. The method of reducing particles of oxygen bearing metal containing material with a reducing gas, comprising: forming with said particles a gas permeable bed having voids and of a shallow depth defined by gas entry and exit surfaces thereof; heating said bed to a reducing temperature less than that sufficient to substantially close the voids of said bed due to melting of said particles; passing said reducing gas through said heated bed substantially from the gas entry surface thereof to the gas exit surface thereof, at a velocity through said bed sufficient to limit the amount of reducing reaction products formed per unit volume of gas to a predetermined relatively low value.

3. The method of reducing particles of oxygen bearing metal containing material with a reducing gas, comprising: forming with said particles a gas permeable bed having voids and of a shallow depth defined by gas entry and exit surfaces thereof; heating said bed to a reducing temperature less than that sufficient to substantially seal the voids of said bed due to melting of said particles; passing said reducing gas through said heated bed substantially from the gas entry surface thereof to the gas exit surface thereof, at a velocity through said bed sufficient to limit the amount of reducing reaction products formed per unit volume of gas to a predetermined relatively low value; and removing said reaction products from said gas after the latter has left the exit surface of said bed.

4. The method of reducing particles of oxygen bearing metal containing material with a reducing gas, comprising: forming with said particles a gas permeable bed having voids and of a shallow depth defined by gas entry and exit surfaces thereof; heating said bed to a reducing temperature less than that sufficient to substantially close the voids of said bed due to melting of said particles; passing said reducing gas through said heated bed substantially from the gas entry surface thereof to the gas exit surface thereof, at a velocity through said bed sufficient to limit the amount of reducing reaction products from said gas after the latter has left the exit surface of said bed; and recirculating the remainder of said gas through said bed.

5. The method of reducing particles of oxygen bearing metal containing material with a reducing gas, comprising: forming with said particles a gas permeable bed having voids and of a shallow depth defined by gas entry and exit surfaces thereof; heating said bed to a reducing temperature less than that sufficient to substantially constrict the voids of said bed due to melting of said particles; passing said reducing gas entry surface thereof to the gas exit surface thereof, at a velocity through said bed sufficient to limit the amount of reducing reaction products formed per unit volume of gas to a predetermined relatively low value; generating a fresh source of reducing gas; recirculating said reducing gas after the latter has left the exit surface of said bed with reducing gas from said fresh source through said bed; and removing a portion of the reducing reaction products from the reducing gas leaving the exit surface of said bed.

6. The method of uniformly reducing oxygen bearing metal containing material with a reducing gas, comprising: preparing said material to relatively fine particle size; forming from said prepared material an uncompacted shallow bed of a depth defined by entry and exit surfaces of said bed; heating said bed to a reducing temperature less than that sufficient to unduly constrict the voids between the particles of said bed due to melting; passing said reducing gas through said heated bed substantially from the entry surface thereof to the exit surface thereof, at a velocity through said bed sufficient to limit the amount of reducing reaction products formed per unit volume of gas to a predetermined relatively low value; generating a fresh source of reducing gas; recirculating said reducing gas after the latter has left the exit surface of said bed with reducing gas from said fresh source through said bed; and removing a portion of the reducing reaction products from said gas at a rate sufficient to correspond to the rate of formation of said products during passage of said gas through said bed.

7. In the method of reducing a bed of oxygen bearing material isolated from the atmosphere, to metallic form at less than melting temperatures, the steps in combination of: passing a reducing gas through said bed at a rate of volume flow therethrough producing a relatively small amount of reaction products per unit volume of gas passing therethrough; and proportioning said bed to a depth less than that at which the velocity for said rate of volume flow therethrough disrupts the material of said bed.

8. In the method of reducing an ore, the steps of: forming a shallow bed of particles of said ore; and passing a reducing gas through said bed at a velocity sufficient to produce a minimum of reaction products per unit volume of said gas but insufficient to disrupt said bed.

9. In the method of reducing an oxygen bearing metal containing material with a reducing gas, the steps of: forming a shallow bed of particles of said material; passing a reducing gas through said bed; and proportioning the depth of said bed in conjunction with the rate of gas flow therethrough to limit the time of contact of a unit volume of reducing gas with said bed to create a minimum of reducing reaction products per unit volume of said gas during passage through said bed.

10. In the method of reducing an oxygen bearing metal containing material with a reducing gas, the steps of: forming a shallow bed of particles of said material; passing a reducing gas through said bed; proportioning the depth of said bed in conjunction with the rate of gas flow therethrough to limit the time of contact of a unit volume of reducing gas with said bed to create a minimum of reducing reaction products per unit volume of said gas during passage through said bed; and maintaining the velocity of gas flow through said bed to a sufficiently low value to avoid disruption of said bed.

11. In the method of reducing finely divided oxygen bearing metal containing material at less than melting temperatures, the steps in combination of: forming a gas permeable bed of said material having gas passages defined by the voids thereof; passing a reducing gas through said bed from one surface to another surface thereof; and restricting gas flow for said bed next a surface thereof to a multitude of passages similar to the gas passages in said bed.

12. In the method of reducing a mass of relatively fine particles of an oxygen bearing metal containing material at less than melting temperatures to metallic form, the steps in combination of: forming a shallow bed of said material; passing a reducing gas through said bed at greater than one-tenth of a cubic foot per minute per square foot of a major surface of said bed; confining the gas to a multitude of passages next said surface corresponding in average diameter to a value not materially greater than the corresponding diameter of the effective passages for gas flow through the voids of said bed; and controlling the effective permeability of said passages to limit the velocity of gas flow through said passages to a value insufficient to cause particles of said bed to become gas borne.

13. The method of forming a slab-like metallic shape having two opposed major surfaces, comprising: forming a mass of relatively fine particles of an oxygen bearing metal containing material reducible to metallic form at less than the melting temperatures of the mass to substantially said shape; forcing a reducing gas under pressure in sufficient volume through said shaped mass, while heating the same to a temperature not greater than that sufficient only to cohere the reduced particles thereof, to provide a minimum of reaction products in said gas as it emerges from said shaped mass; and restricting the flow of gas next and beyond a major surface of said shaped mass and resulting article to a multitude of passages of an average diameter not materially greater than the corresponding diameter of the effective passages for gas flow through the voids existing between the particles of said mass.

14. The method of forming a slab-like metallic shape having two opposed major surfaces comprising: forming a mass of relatively fine particles of an oxygen bearing metal containing material reducible to metallic form at less than the melting temperature of the mass to substantially said shape; forcing a reducing gas under pressure in sufficient volume through said shaped mass from one major surface thereof to the other, while heating the same to a temperature not greater than that sufficient only to cohere the reduced particles thereof, to provide a minimum of reaction products in said gas as it emerges from said shaped mass; restricting the flow of gas next and beyond said one major surface of said shaped mass and resulting articles to a multitude of passages of an average diameter not materially greater than the corresponding diameter of the effective passages for gas flow through the voids existing between the particles of said mass; and controlling the overall effective permeability of said passages in conjunction with the pressure of gas flow to limit the volume of gas flow through to said mass to a value insufficient to cause particles of said mass to become gas borne by reason of the velocity of gas flow through the voids thereof.

15. The method of forming a discrete article of predetermined shape, comprising: supporting finely divided oxygen bearing metal containing material to a desired shape; passing a large volume of reducing gas through the supported material from one surface to another surface thereof; and confining the flow of gas next one of said surfaces of said material to a plurality of passages each effectively conforming to the passages for gas flow in said mass defined by voids between the particles thereof.

16. The method according to claim 15 and the step of: preheating said supported material substantially to a reducing temperature before passing said reducing gas therethrough.

17. The method according to claim 15 and the step of: preheating said material to break up the crystal structure thereof.

18. The method according to claim 15 and the step of: preheating said material while supported to a sintering temperature to effectively cohere said material to withstand a greater velocity of gas passage therethrough without disrupting.

References Cited in the file of this patent

UNITED STATES PATENTS

| 2,107,549 | Schmalfeldt | Feb. 8, 1938 |
| 2,142,100 | Avery | Jan. 3, 1939 |

FOREIGN PATENTS

| 645,030 | Great Britain | Oct. 25, 1950 |
| 364,699 | Great Britain | Jan. 14, 1952 |